(No Model.) 3 Sheets—Sheet 3.
T. A. EDISON.
KINETOGRAPHIC CAMERA.
No. 589,168. Patented Aug. 31, 1897.
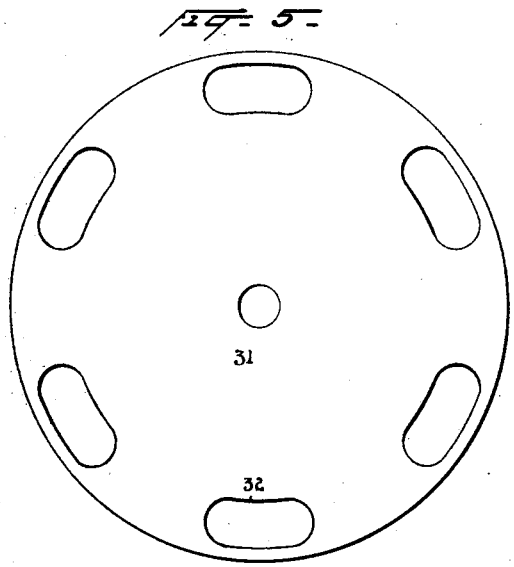
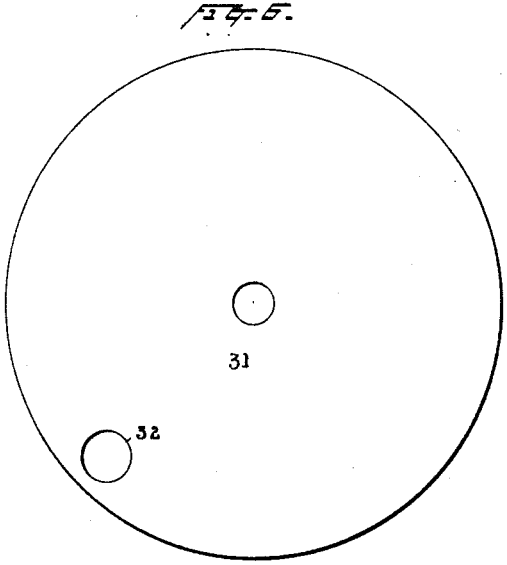
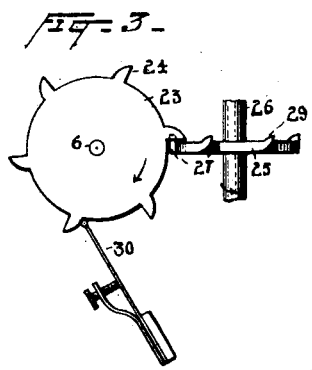
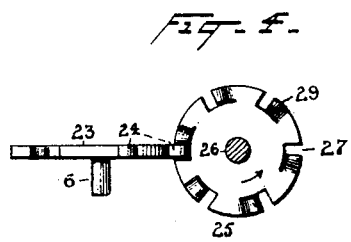
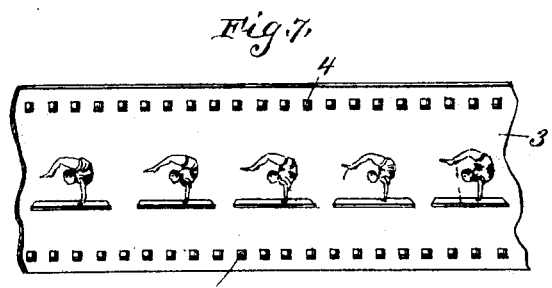
Witnesses
Norris A. Clark
W. Pelger
Inventor
Thomas A. Edison
By his Attorneys
Dyer & Seely

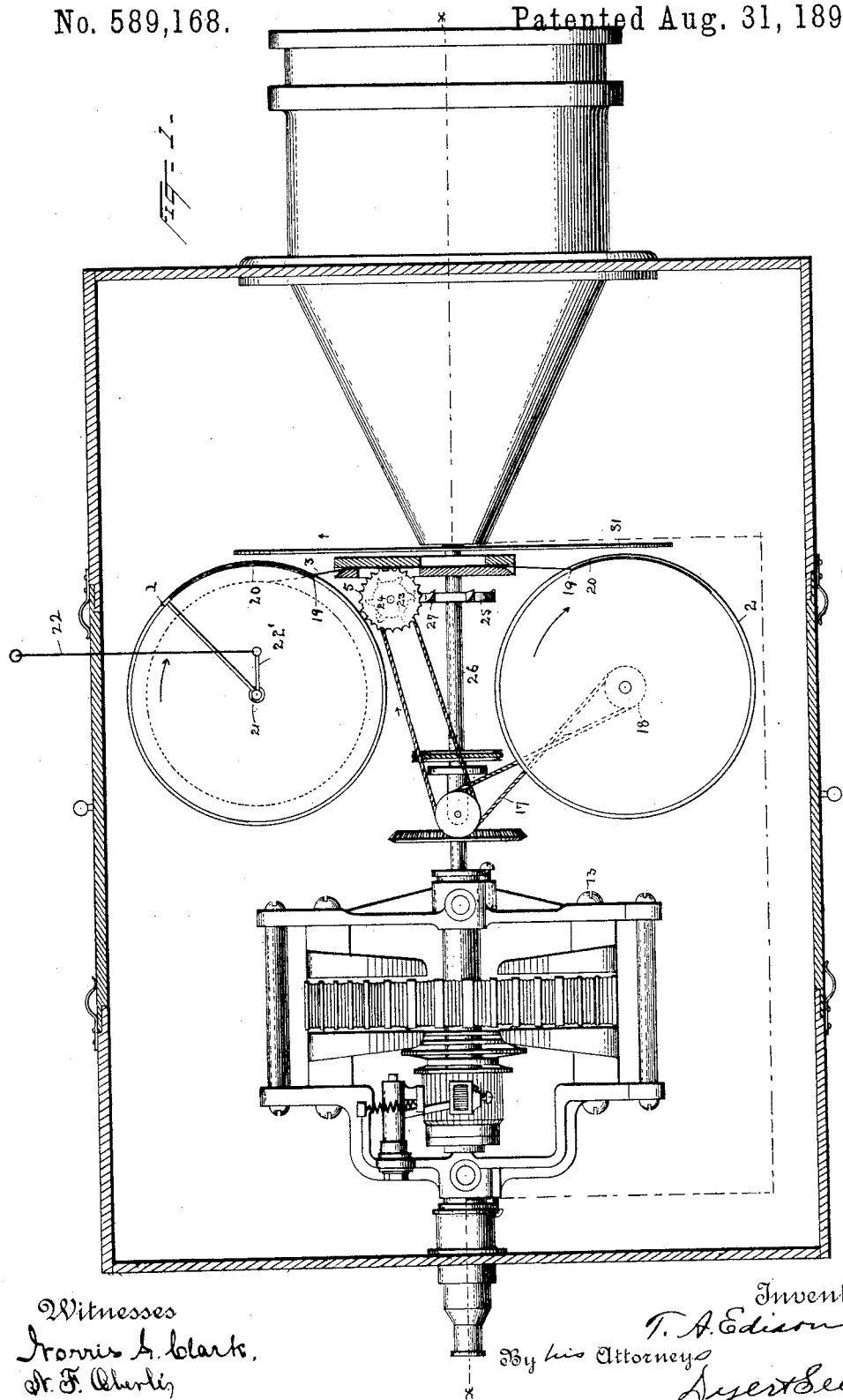

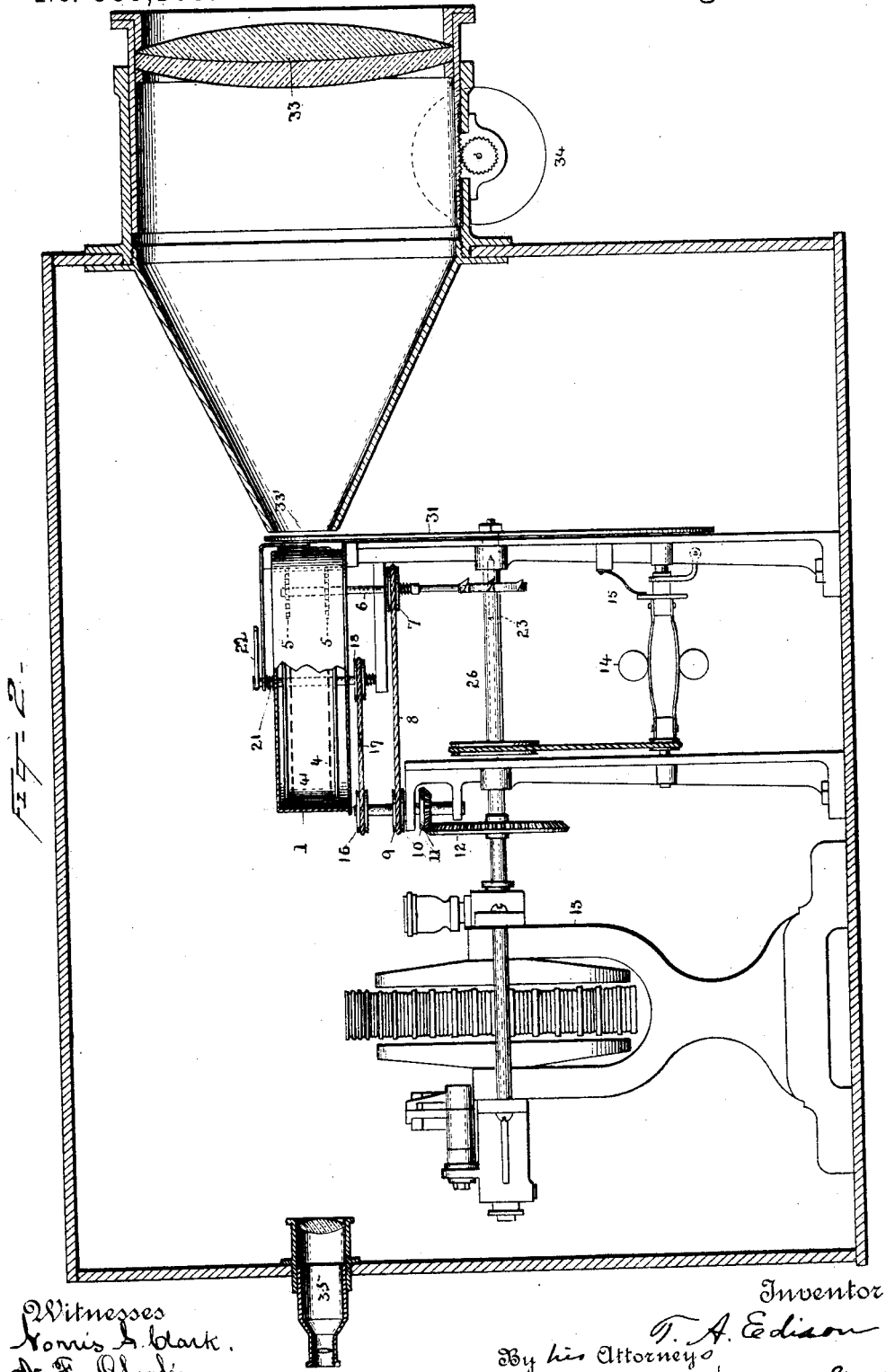

UNITED STATES PATENT OFFICE.

THOMAS A. EDISON, OF LLEWELLYN PARK, NEW JERSEY.

KINETOGRAPHIC CAMERA.

SPECIFICATION forming part of Letters Patent No. 589,168, dated August 31, 1897.

Application filed August 24, 1891. Serial No. 403,534. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Kinetoscopes, (Case No. 928,) of which the following is a specification.

The purpose I have in view is to produce pictures representing objects in motion throughout an extended period of time which may be utilized to exhibit the scene including such moving objects in a perfect and natural manner by means of a suitable exhibiting apparatus, such as that described in an application filed simultaneously herewith, (Patent No. 493,426, dated March 14, 1893.) I have found that it is possible to accomplish this end by means of photography.

In carrying out my invention I employ an apparatus for effecting by photography a representation suitable for reproduction of a scene including a moving object or objects comprising a means, such a single camera, for intermittently projecting at such rapid rate as to result in persistence of vision images of successive positions of the object or objects in motion as observed from a fixed and single point of view, a sensitized tape-like film, and a means for so moving the film as to cause the successive images to be received thereon separately and in single-line sequence. The movements of the tape-film may be continuous or intermittent, but the latter is preferable, and it is further preferable that the periods of rest of the film should be longer than the periods of movement.

By taking the photographs at a rate sufficiently high as to result in persistence of vision the developed photographs will, when brought successively into view by an exhibiting apparatus, reproduce the movements faithfully and naturally.

I have been able to take with a single camera and a tape-film as many as forty-six photographs per second, each having a size measured lengthwise of the tape of one inch, and I have also been able to hold the tape at rest for nine-tenths of the time; but I do not wish to limit the scope of my invention to this high rate of speed nor to this great disproportion between the periods of rest and the periods of motion, since with some subjects a speed as low as thirty pictures per second or even lower is sufficient, and while it is desirable to make the periods of rest as much longer than the periods of motion as possible any excess of the periods of rest over the periods of motion is advantageous.

In the accompanying drawings, forming a part hereof, Figure 1 is a plan view, with the top of the casing removed, of a form of apparatus which I have found highly useful for the taking of the photographs. Fig. 2 is a vertical longitudinal section on line $x\,x$ in Fig. 1. Figs. 3 and 4 are enlarged views of the stop mechanism of the photographing apparatus. Figs. 5 and 6 are plan views of two different forms of shutters for the photographing apparatus, and Fig. 7 is a perspective view of a section of the tape-film with the photographs thereon.

Referring to the drawings, 3 indicates the transparent or translucent tape-film, which before the apparatus is put in operation is all coiled on a reel in the sheet-metal box or case 1, the free end being connected to an empty reel in the case 2. The film 3 is preferably of sufficient width to admit the taking of pictures one inch in diameter between the rows of holes 4, Figs. 2 and 7, arranged at regular intervals along the two edges of the film, and into which holes the teeth of the wheels 5, Figs. 1 and 2, enter for the purpose of positively advancing the film. When the film is narrow, it is not essential to use two rows of perforations and two feed-wheels, one feed-wheel being sufficient. Said wheels are mounted on a shaft 6, which carries a loose pulley 7—that is, a pulley frictionally connected to its shaft and forming a yielding mechanical connection. This pulley is driven by a cord or belt 8 from a pulley 9 on the shaft 10, which shaft is driven by means of the beveled gears 11 12. The wheel 12 is preferably driven by an electric motor 13, which when the apparatus is in use is regulated to run at the desired uniform speed, being controlled by the centrifugal governor 14 and the circuit-controller 15 in a well-known manner. On the shaft 10 is another pulley 16, which is connected by a cross-belt 17 to a pulley 18, also frictionally connected to its shaft, and which carries the reel to which the tape is connected in casing 2. The film passes from the casing 1 through a slit formed by the edge 19 and the sliding door 20, which is normally thrown forward by the spring 21, Fig. 2, with sufficient force to clamp the film and hold it from movement. When the door 20 is retracted by pulling on the rod or string 22, which is connected to the arm 22', the film is liberated and allowed to advance. Film-case 2 is provided with a similar door, but the device for moving the door is not illustrated. This arrangement of the sliding door not only holds the film, but it tightly closes the casing, thus excluding light and protecting the sensitive film. The casings or boxes 1 2 are removable, so that they, with the inclosed film, may be taken bodily from the apparatus. The shaft 6, heretofore referred to, is provided with a detent or stop-wheel 23, the form of which is most clearly shown in Figs. 3 and 4. The wheel 23 is provided with a number of projecting teeth 24, six being shown, which teeth are adapted to strike successively against the face of the coöperating detent or stop-wheel 25 on the shaft 26, which is the armature-shaft of the motor or a shaft which is constantly driven by the motor. The wheel 25 has a corresponding number of notches 27 at regular intervals around its periphery. These notches are of such size and shape that the teeth 24 can pass through them, and when the wheels 23 and 25 are rotated in the direction indicated by the arrows each tooth in succession will strike the face of wheel 23, thereby bringing the film absolutely to rest at the same moment that an opening in the shutter exposes the film and will then pass through a notch, allowing the tape-film to be moved forward another step while it is covered by the shutter. To avoid the danger of the wheel 25 moving so quickly that a tooth cannot enter the proper notch, a laterally-projecting tooth 29 is provided adjacent to each notch. When a tooth 29 strikes a tooth 24, the latter tooth will be guided by the tooth 29 into the adjacent notch 27.

30 is a detent spring or pawl to prevent backward movement of the wheel 23.

I prefer to so proportion the parts above described that the wheel 23 is at rest for nine-tenths of the time in order to give to the sensitized film as long an exposure as practicable and is moving forward one-tenth of the time, and said forward movement is made to take place thirty or more times per second, preferably at least as high as forty-six times per second, although the rapidity of movement or number of times per second may be regulated as desired to give satisfactory results. The longer interval of rest of the film insures a good impression of the object projected thereon and results in a picture having clean and sharp lines, since the film has sufficient time to become steady and overcome the vibration caused by the sudden and rapid motions of the feed mechanism. On the shaft 26 or on any suitable shaft driven by the motor is a revolving disk 31, serving as a shutter for alternately exposing and covering the sensitive film. This disk, which is continuously revolving, is provided with six or any other suitable number of apertures 32 at regular intervals around it near the edge, they being so arranged that one of the apertures passes directly between the camera-lens 33 and the film each time the film is brought to rest, the light-rays passing through the opening 33' and falling on the film half-way between the reels on which the film is wound.

34 is a device for adjusting the camera-lens toward or from the film, and 35 is a device by means of which the operator can focus the camera on the object to be photographed.

While I have described the use of an intermittently-moving film and a shutter having several openings so arranged as to expose the film at proper intervals, it would be possible and within my invention to use a continuously-moving film, and also to use a shutter with a single opening, as shown in Fig. 6, the shutter revolving at a high rate of speed.

To make the apparatus move the film continuously, it will only be necessary to omit the stop-wheels 23 and 25, which arrest the rotation of the shaft 6.

Although the operation has been partially indicated in the description of the apparatus it will now be set forth more in detail.

The apparatus is first charged with a sensitive tape-film several hundred or even thousands of feet long and the motor is set in operation. Since the spring 21 causes the door 20 to clamp the film, as already described, the loose pulleys 7 18 slip without pulling said film along, but when a moving object—for example, a man gesticulating—is placed in the field of the camera and the handle 22 is pulled the film is released and the pulleys operate to pull the same along. At the same time the reel in case 2 is rotated to wind up the film, thus transferring it from the reel in case 1 to the reel in case 2. In the apparatus shown in Fig. 1 this movement is not continuous, but, as already indicated, is intermittent, the film advancing by very rapid steps, which are definitely and positively controlled by means of the peculiar detent or escapement described, and a photograph is taken after each step.

While I do not care to limit myself to any particular number of steps per second, there should be at least enough so that the eye of an observer cannot distinguish, or at least cannot clearly and positively distinguish, at a glance a difference in the position occupied by the object in the successive pictures, as illustrated in Fig. 7. A less speed in taking the pictures will cause a trembling or jerky appearance in the reproduced picture. When the movement of the object being photographed has ceased or the desired number of photographs has been obtained, the apparatus is stopped. The film is suitably treated for developing and fixing the pictures, when it is ready for use in an exhibiting apparatus.

What I claim is—

1. An apparatus for effecting by photography a representation, suitable for reproduction, of a scene including a moving object or objects, comprising a means for intermittently projecting at such rapid rate as to result in persistence of vision images of successive positions of the object or objects in motion, as observed from a fixed and single point of view, a sensitized tape-like film, and a means for so moving the film as to cause the successive images to be received thereon separately and in a single-line sequence.

2. An apparatus for taking photographs suitable for the exhibition of objects in motion, having in combination a single camera, and means for passing a sensitized tape-film at a high rate of speed across the lens of the camera and for exposing successive portions of the film in rapid succession, substantially as set forth.

3. An apparatus for taking photographs suitable for the exhibition of objects in motion, having in combination a single camera, and means for passing a sensitized tape-film across the lens of the camera at a high rate of speed and with an intermittent motion, and for exposing successive portions of the film during the periods of rest, substantially as set forth.

4. An apparatus for taking photographs suitable for the exhibition of objects in motion, having in combination a single camera, and means for passing a sensitized tape-film across the lens at a high rate of speed and with an intermittent motion, and for exposing successive portions of the film during the periods of rest, the periods of rest being greater than the periods of motion, substantially as set forth.

5. An unbroken transparent or translucent tape-like photographic film having thereon equidistant photographs of successive positions of an object in motion, all taken from the same point of view, such photographs being arranged in a continuous straight-line sequence, unlimited in number save by the length of the film, substantially as described.

6. An unbroken transparent or translucent tape-like photographic film provided with perforated edges and having thereon equidistant photographs of successive positions of an object in motion, all taken from the same point of view, such photographs being arranged in a continuous straight-line sequence, unlimited in number save by the length of the film, substantially as described.

This specification signed and witnessed this 31st day of July, 1891.

THOS. A. EDISON.

Witnesses:
JOHN F. RANDOLPH,
FREDERICK OTT.